United States Patent
Khanna

[11] Patent Number: 5,978,849
[45] Date of Patent: Nov. 2, 1999

[54] SYSTEMS, METHODS, AND COMPUTER PROGRAM PRODUCTS FOR ESTABLISHING TCP CONNECTIONS USING INFORMATION FROM CLOSED TCP CONNECTIONS IN TIME-WAIT STATE

[75] Inventor: Sanjay Khanna, Cary, N.C.

[73] Assignee: International Business Machines Corporation, Armonk, N.Y.

[21] Appl. No.: 08/874,705

[22] Filed: Jun. 13, 1997

[51] Int. Cl.⁶ .................................................. G06F 13/14
[52] U.S. Cl. ........................................... 709/227; 709/230
[58] Field of Search .................. 395/200.57, 200.58, 395/200.66, 200.67; 709/227, 230, 228, 236, 237; 370/431, 438

[56] References Cited

U.S. PATENT DOCUMENTS

| | | | |
|---|---|---|---|
| 5,430,709 | 7/1995 | Galloway | 370/13 |
| 5,530,905 | 6/1996 | Nichols et al. | 395/876 |
| 5,553,241 | 9/1996 | Shirakihara | 395/200.12 |
| 5,553,242 | 9/1996 | Russell et al. | 395/200.12 |
| 5,644,715 | 7/1997 | Baugher | 395/200.04 |
| 5,721,817 | 2/1998 | Kurihara et al. | 395/200.12 |
| 5,754,752 | 5/1998 | Sheh et al. | 395/182.02 |
| 5,812,784 | 9/1998 | Watson et al. | 395/200.57 |
| 5,835,724 | 11/1998 | Smith | 395/200.57 |

*Primary Examiner*—Mark H. Rinehart
*Assistant Examiner*—Marc D Thompson
*Attorney, Agent, or Firm*—Myers Bigel Sibley & Sajovec, P.A.; Jeannine S. Ray-Yarletts

[57] ABSTRACT

Systems, methods, and computer program products facilitate establishing a TCP connection between a client and a server utilizing a control block associated with a previous connection between the client and the server wherein the previous connection is in TIME-WAIT state.

9 Claims, 5 Drawing Sheets

SYSTEMS, METHODS, AND COMPUTER PROGRAM PRODUCTS FOR ESTABLISHING TCP CONNECTIONS USING INFORMATION FROM CLOSED TCP CONNECTIONS IN TIME-WAIT STATE

FIELD OF THE INVENTION

The present invention relates generally to data processing systems, methods, and computer program products, and more particularly to data processing systems, methods, and computer program products for facilitating client-server communications.

BACKGROUND OF THE INVENTION

The recent publicity and emphasis on the "information superhighway" has increased awareness and acceptance of the Internet as a mass communication media. This broad based recognition of the Internet as a viable media for communication and interaction across multiple networks has also created a large established user base built upon the Internet standardized protocols for interaction between computer networks.

The paradigm for the Internet is that of a client-server relationship where Internet clients (browsers) communicate with Internet servers. To provide greater access to the Internet, the communication protocols and languages utilized by the clients and servers have become standardized. These protocols include the Hyper-Text Transfer Protocol (HTTP), which is the communication protocol used for communications between clients and servers, and the Transfer Control Protocol/Internet Protocol (TCP/IP). The TCP portion is the transport-specific protocol for communication between computers or applications. IP is a lower-level protocol than TCP and facilitates the transmission of data packets between remotely-located machines. TCP is a transport-level protocol that operates on top of IP. TCP provides a full-duplex byte stream between applications, whether they reside on the same machine or on remotely-located machines. TCP ensures that transmitted data packets are received in the same order in which they were transmitted.

TCP is a connection-oriented reliable transport protocol layered over IP. Each TCP connection maintains information about a connection's state in a data structure called a Transmission Control Block (TCB). In addition to information about a connection's state, a TCB typically also contains various other connection information, as is known to those skilled in the art. When a server actively closes a TCP connection with a client, the TCB associated with the connection is maintained by the server for a period of time, referred to as "TIME-WAIT" state. The length of time a closed connection remains in TIME-WAIT state is typically two times the maximum segment lifetime (MSL). By definition a MSL is equivalent to thirty seconds. The server must, as a result, allocate resources for each closed connection for a period of one minute. Busy servers often have connection tables full of closed connections in TIME-WAIT state. As connection tables fill up with closed connections in TIME-WAIT state, room for new connections often becomes unavailable. As a result, server performance suffers and fewer client connections can be established with the server until connections in TIME-WAIT state are purged or aged.

Another characteristic of TCP is a technique referred to as "slow-start." TCP does not fully utilize available network bandwidth for the first few round-trips of a connection between a client and a server. Slow-start is a network congestion avoidance mechanism which is employed when a client-server connection is established, a packet is lost or long network delays occur. Slow-start initially allows the sender to send only one packet. For each acknowledgement that is received, the number of packets that the sender is allowed to transmit is increased by one.

In slow-start, a both ends of a connection maintain a window of unacknowledged packets called the congestion window. When a connection starts up, each sender is only allowed to have a single unacknowledged packet in transit. When an acknowledgement is received, the congestion window is incremented from one to two, and two packets can be sent. When each of those two packets is acknowledged, the congestion window is increased to four. The window is opened gradually, doubling the number of data packets each round-trip time. As is known to those having skill in the art, TCP achieves full throughput first when the effective window size is at least the product of the round-trip delay and the available network bandwidth. Although slow-start is advantageous for avoiding network congestion, it degrades server performance when many short-lived connections are made.

In the context of World Wide Web ("web") client/server applications, the client may be a web browser which acts as the user interface. The web browser sends user requests to the appropriate web server and formats and displays the HTML data returned from the web server. The web browser also evaluates the HTML data to determine if there are any embedded hyper-link statements in the HTML data which would require subsequent browser requests which would then be initiated by the browser. A web server acts as the server for the client and processes a web browser's requests and returns the requested response as an HTML data portion of a HTTP data stream. Thus, it is possible for a Web server to have repeated connections to the same client over a short period of time.

SUMMARY OF THE INVENTION

In light of the above discussion, it is an object of the present invention to increase the performance of web servers by facilitating the servicing of as many client requests as possible within the smallest amount of time.

It is a further object of the present invention to reduce degradation of server performance caused by slow-start.

It is another object of the present invention to reduce degradation of server performance caused by maintaining closed connections in TIME-WAIT state.

These and other objects of the present invention are provided by methods, data processing systems and computer program products for establishing a TCP connection between a client and a server utilizing a control block associated with a previous connection between the client and the server. When a request is received from the client to the server to establish a connection between the client and the server, the creation of a control block at the server for the requested connection is delayed. A list of control blocks of connections in TIME-WAIT state is then searched to determine if a control block associated with a closed connection between the requesting client and the server is included in the list of control blocks. The list of control blocks is a searchable list of control blocks associated with closed connections in TIME-WAIT state. If such a control block is found, it is removed from the list and placed in a list of active connections between the requesting client and the server. At least one field therein is reinitialized, and a connection is established with the requesting client.

The present invention is advantageous because the amount of server resources needed to establish and close connections with clients is reduced. Because server resources are conserved, performance is improved whereby more connections can be handled within a shorter period of time. The present invention is also advantageous because cached routing information and linked state information can be preserved. As a result, existing TCBS, and the information therewithin, for a connection can be reused. Only fields within the control blocks that change from connection to connection need be reinitialized. A further advantage of the present invention is that slow-start is avoided because the start of the connection is saved from previous data transfers between the server and the client.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Client-Server Communications

Figure 1:
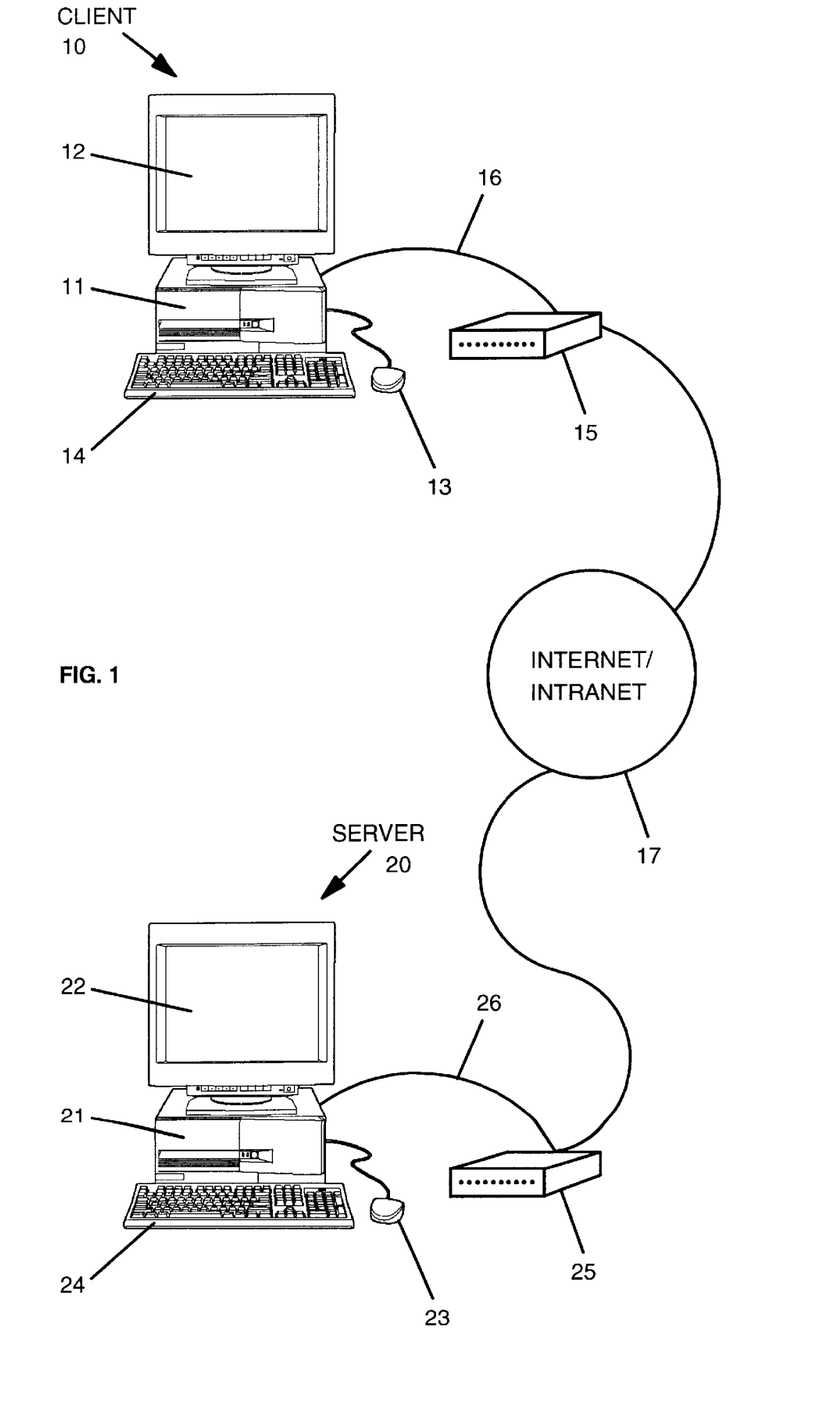
FIG. 1 schematically illustrates a client and server in communication via a computer network.

Referring now to FIG. 1, a client-server communications configuration within which the present invention can be implemented is schematically illustrated. As is known to those with skill in the art, client-server environments may include public networks, such as the Internet, and private networks often referred to as "Intranets." Hereinafter, all references to Web pages shall include Web pages residing on servers connected to the Internet and Web pages residing on servers connected to an Intranet. Hereinafter, the term "Internet" shall incorporate the term "Intranet" and any references to accessing the Internet shall be understood to mean accessing an Intranet as well. Hereinafter, the term "computer network" shall incorporate publicly-accessible computer networks and private computer networks.

Users typically access the Internet via a computer or terminal referred to as a client 10. Exemplary clients 10 may include, but are not limited to, computers and terminals manufactured by Apple®, Sun Microsystems®, Digital Equipment Corporation®, Hewlett-Packard®, IBM®, as well as IBM-compatible personal computers manufactured by various manufacturers. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The internet connection 16 may be made either by a direct connection of the client 10 to the Internet or indirectly via another device connected to the Internet. In the latter case, the client 10 is typically connected to this device via a local or wide area network (LAN or WAN). Typically, data transfer rates between a client 10 and a server are equal to, or greater than, fourteen thousand four hundred baud (14,400 baud). However, lower data transfer rates are sometimes encountered. The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server to store various data transferred from the server.

A user accesses a Web page by establishing a TCP connection between the client 10 and a server 20 (referred to hereinafter as a Web server) hosting the Web page. For the majority of Internet communications, a client communicates with a Web server using HTTP protocol over the TCP connection between the client and Web server. Typically, the data transferred between the client and the Web server are HTTP data objects (e.g. HTML data). A Web server may be a proxy which receives requests from a number of clients and routes the requests to the appropriate Web server. Web servers are often called HTTP servers.

As is known by those having skill in the art, a Web server 20 typically has a configuration similar to that of a client 10 and includes a central processing unit 21, a display 22, a pointing device 23, a keyboard 24, access to persistent data storage, and an Internet connection 26 for connecting to the Internet 17 via a modem 25, or otherwise. It is preferable that a Web server have at least an Intel® Pentium® processor or equivalent, at least sixteen megabytes (16 MB) of RAM, and at least eight hundred megabytes (800 MB) of data storage. However, a Web server 20 may be implemented using other processors and via other computing devices, including, but not limited to, mainframe computing systems and mini-computers. Web server software handles requests from clients for documents, whether they are text, graphic, multimedia, or virtual. The Web server software typically runs under the operating system of the Web server.

Figure 2:
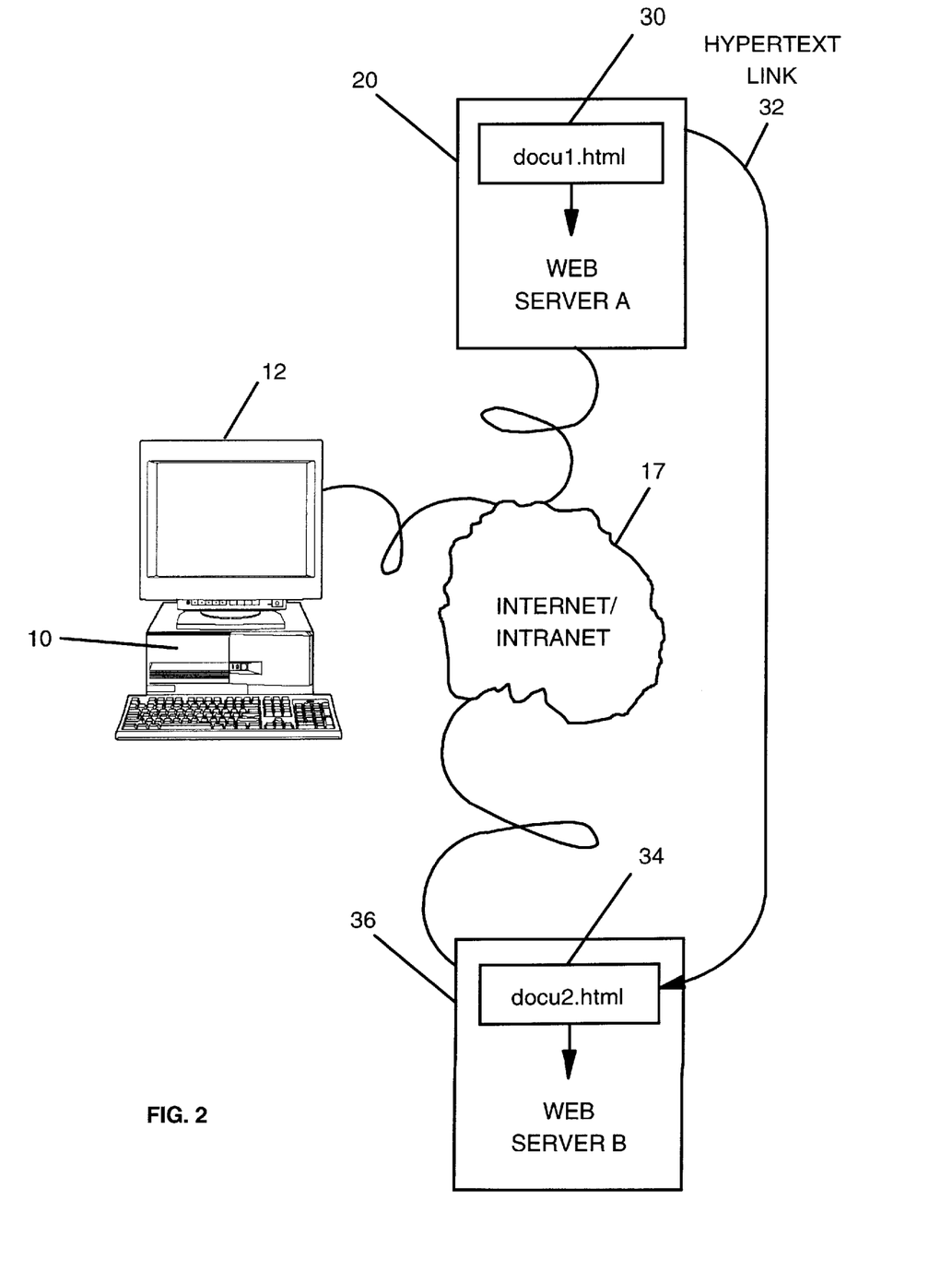
FIG. 2 schematically illustrates a client accessing a hypertext document, such as a Web page, hosted by a server.

Referring now to FIG. 2, accessing a Web page hosted by a Web server is schematically illustrated. During a typical communication, a client 10, via a browser residing on the client, makes a TCP/IP request for a Web page 30 from the host Web server 20 and displays the Web page on the client display device 12. If the displayed Web page 30 contains a hypertext link 32, the user can activate that link, and the browser will retrieve the linked Web page 34 from its host Web server 36.

It is understood that a client or Web server or other apparatus configured to execute program code embodied within computer usable media, operates as means for performing the various functions and carries out the methods of the various operations, according to the various embodiments of the present invention.

TCP

The primary responsibility of TCP is to establish a reliable connection between a client and a server through which the client and server can communicate. TCP connections are uniquely identified by the IP address and port number at both the client and server. Each unique TCP connection is referred to as a "tuple." One part of the tuple consists of the client IP address and port number; the other part of the tuple consists of the server IP address and port number.

The maintenance of a TCP connection involves storing several variables in a connection record called a Transmission Control Block or TCB. A TCB is associated with each connection between a client and server. As is known to those skilled in the art, a TCB contains information about local process state and per-connection shared state. Local process state information includes pointers to send and receive buffers, pointers to retransmission queue and current segment, and the like. Per-connection shared state information includes macro-state and micro-state information. Micro-state describes the finite state machine, such as endpoint numbers and components (timers, flags) used to help maintain that state. This includes the protocol for establishing and maintaining shared state about the connection. Macro-state describes the protocol after a connection has been established to maintain the reliability and congestion control of the data transferred in the connection.

As is known to those skilled in the art, a TCP connection progresses through a series of states during its lifetime. These states include: LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and the fictional state CLOSED. CLOSED is fictional because it represents the state when there is no TCB, and therefore, no connection. LISTEN represents waiting for a connection request from any remote TCP and port. SYN-SENT represents waiting for a matching connection request after having sent a connection request. SYN-RECEIVED represents waiting for a confirming connection request acknowledgment after having both received and sent a connection request. ESTABLISHED represents an open connection where data received can be delivered to a user. ESTABLISHED is the normal state for the data transfer phase of a TCP connection. FIN-WAIT-1 represents waiting for a connection termination request from the remote TCP, or an acknowledgment of the connection termination request previously sent. FIN-WAIT-2 represents waiting for a connection termination request from the remote TCP. CLOSE-WAIT represents waiting for a connection termination request from the local user. CLOSING represents waiting for a connection termination request acknowledgment from the remote TCP. LAST-ACK represents waiting for an acknowledgment of the connection termination request previously sent to the remote TCP (which includes an acknowledgment of its connection termination request). TIME-WAIT represents waiting for enough time to pass to be sure the remote TCP received the acknowledgment of its connection termination request. CLOSED represents no connection state at all.

Figure 3:
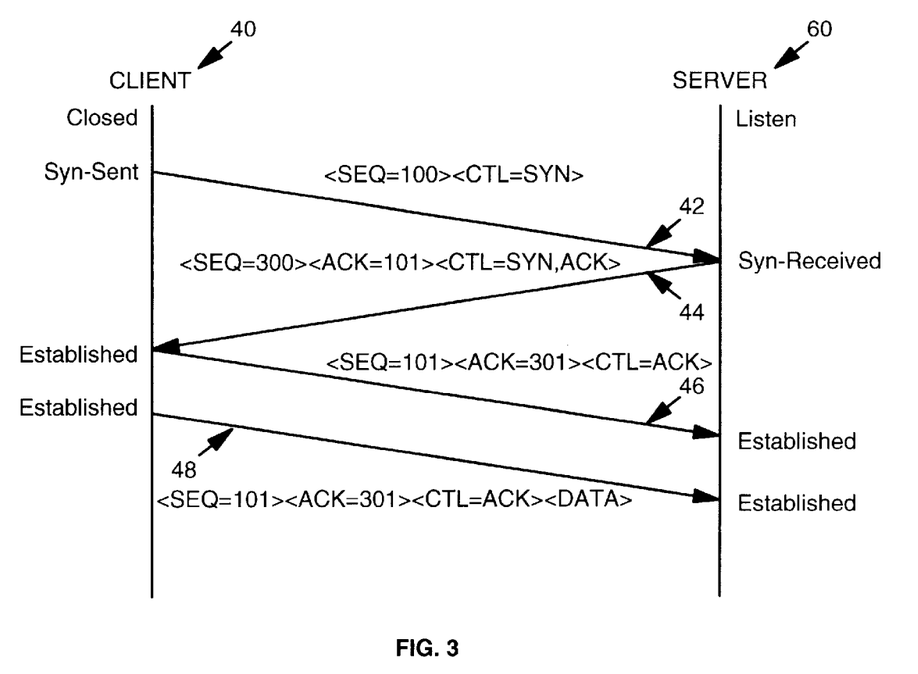
FIG. 3 schematically illustrates a three-way handshake for establishing a connection between a client and a server.

A TCP connection is typically established with a three-way handshake similar to that illustrated in FIG. 3. Initially, before a TCP connection is established, the client 40 is in a "closed" TCP state and the server 60 is in a "listen" TCP state, as illustrated. The remainder of the illustrated states represent the state after the departure or arrival of the segment (whose contents are shown in the center of each line). The following segment contents are shown in abbreviated form: sequence number ("SEQ"), control flags ("CTL"), and acknowledge ("ACK"). Other fields such as window, addresses, lengths, and text have been left out in the interest of clarity.

The client 40 begins the three-way handshake by sending a "synchronize sequence numbers" (SYN) segment 42 indicating that it will use sequence numbers starting with sequence number 100. The server 60 sends a SYN segment 44 and acknowledges the SYN segment 42 it received from the client 40. The acknowledgment field of the SYN segment 44 indicates the server 60 is now expecting to hear sequence 101, acknowledging the SYN segment 42 which occupied sequence 100. The client 40 responds with an empty segment 46 containing an ACK for the SYN segment 44 transmitted by the server 60. At this stage, the TCP connection is established between the client 40 and server 60 and data can be transferred therebetween. Once the connection is established, the client 40 sends a data segment 48 to the server 60 for processing, as illustrated.

As is known to those skilled in the art, the primary purpose of a three-way handshake is to exchange connection information between a client and a server, and to prevent old duplicate connection initiations from causing confusion. During a three-way handshake, a client and server also exchange other information including Maximum Segment Size (MSS).

Figure 4:
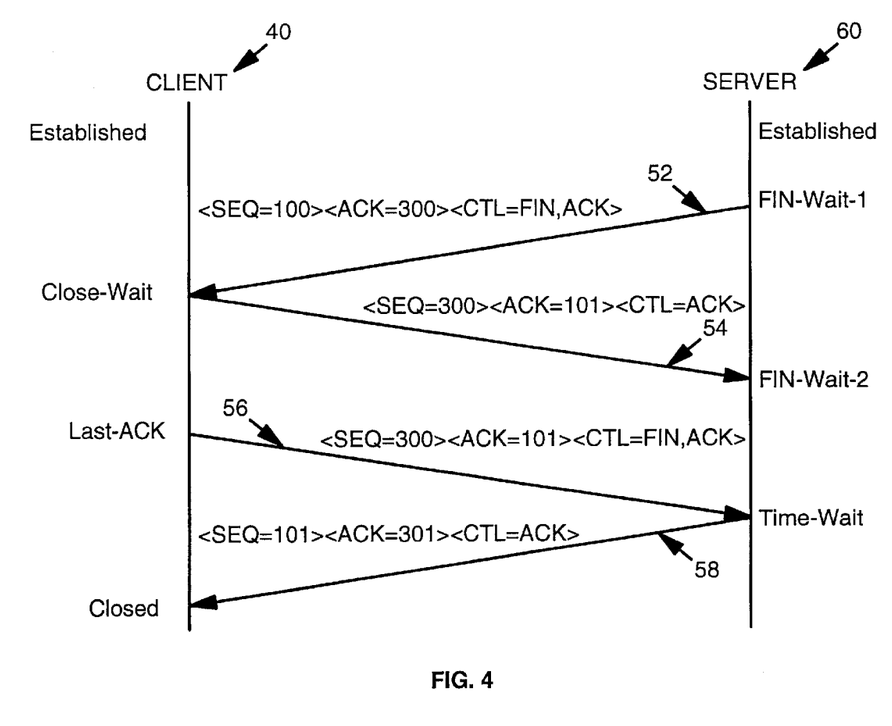
FIG. 4 schematically illustrates a four-way handshake for closing a connection between a client and a server.

A TCP connection is typically closed with a four-way handshake, where SYN is replaced with FIN. There is a 2*MSL waiting period between the three-way handshake and the actual closing of a connection. As shown in FIG. 4, the client 40 issues a "FIN" (short for "finish") segment 52 to initiate termination. The server 60 is in FIN-WAIT-1 state at this stage. The client 40 responds to the server 60 with an ACK segment 54. The client 40 is in CLOSE-WAIT state at this stage and the server 60 is in FIN-WAIT-2 state. The client 40 issues its own FIN segment 56 and the server 60, which is in TIME-WAIT state at this stage, responds with an ACK segment 58.

TIME-WAIT State

The server end of a closed connection remains in TIME-WAIT state for a time equal to two times the maximum segment lifetime (2*MSL). The MSL is defined to be thirty (30) seconds. The TIME-WAIT state limits the rate of successive transactions between the same tuple, since a new initiation of the connection cannot be opened until the TIME-WAIT delay expires.

For every TCP connection, there are three control blocks associated therewith. These are a socket control block (or socket), an Internet control block (or INPCB), and a TCP control block (or TCPCB). As is known to those skilled in the art, a global linked list of INPCBs of all TCP connections is maintained inside the kernal where the TCP/IP stack is implemented and is called a "TCB List." This TCB List is searched every time a TCP segment is received to find out which connection the TCP segment belongs to. Since connections in the TIME-WAIT state are mostly idle connections waiting to be timed out, they add to the linked list search overhead.

When a connection is closed actively, the connection lingers in TIME-WAIT state for 2*MSL. However, the server may accept a new SYN from a client to reopen the connection directly from TIME-WAIT state, if the server: assigns its initial sequence number for the new connection to be larger than the largest sequence number used on the previous connection incarnation, and returns to TIME-WAIT state if the SYN turns out to be an old duplicate.

According to the present invention, when a server receives a SYN segment from a client, the creation of a socket, an INPCB, and a TCPCB are delayed. Upon completion of a three-way handshake, the list of connections (represented by INPCBs) in TIME-WAIT state (referred to as "TW_TCB List") is searched to see if there is a connection from the same client sending the SYN segment and to the same server port as the requested server port. If such a connection is located, the INPCB associated with the connection is removed from the TW_TCB list and placed in the TCB list. If a connection is not located, then a new socket, INPCB and TCPCB are created.

Upon being placed within the TCB list, only the control block fields which change from connection to connection are reinitialized. Exemplary fields include foreign port numbers, state of connection, sequrence numbers, MSS, and the like. The cached route and state of the linked information is preserved. The accept( ) procedure is then completed for the listening application. As is known to those skilled in the art, the server listens on a known port by issuing accept( ). The server end of the connection is then moved to "established" state. When the server does accept( ) to find the newly-connected client, a new socket number is assigned and is returned to the server.

Figure 5:
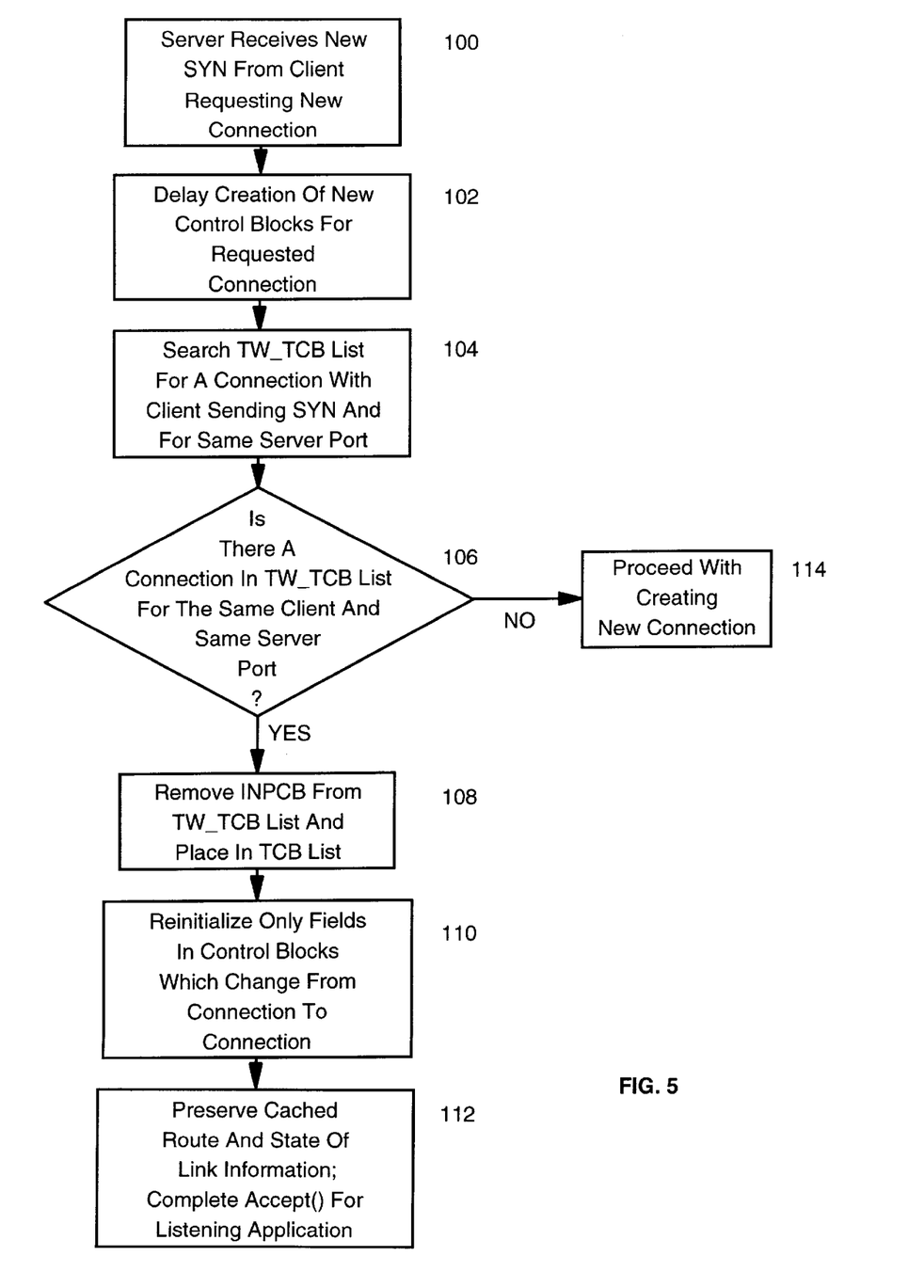
FIG. 5 is a flowchart schematically illustrating operations for various aspects of the present invention.

Referring now to FIG. 5, operations for carrying out the present invention are illustrated. A server receives a new SYN segment from a client requesting a connection with the server (Block 100). The creation of new control blocks for the requested connection is delayed (Block 102). The TW_TCB list is searched for a connection with the client sending the SYN segment and for the same server port (Block 104). A determination is made whether a connection with the client sending the SYN segment and for the same server port is within the TW_TCB list (Block 106). If a connection is not located in the TW_TCB, a new connection is created by creating new control blocks (Block 114).

If a connection is located in the TW_TCB, the INPCB associated with the connection is removed from the TW_TCB list and placed in the TCB list (Block 108). The fields within the INPCB that change from connection to connection are reinitialized (Block 110). The cached routing information and state information are preserved and the accept( ) procedure is completed for the listening application on the server (Block 112).

It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of establishing a TCP connection between a client and a server, wherein the TCP connection comprises a client connection end and a server connection end, and wherein a connection end for the client is defined by a first Internet protocol (IP) address and a first port number, and wherein a connection end for the server is defined by a second IP address and a second port number, the method comprising the following steps:

receiving a request from the client to the server to establish the TCP connection;

delaying creation of a socket control block, an Internet control block (INPCB), and a TCP control block (TCPCB) for the requested connection;

locating a TCP connection having a server end in TIME-WAIT state, wherein the server end is defined by the second IP address and the second port number;

changing the located server end from TIME-WAIT state to established state; and using TCP connection information within a TCPCB associated with the located server end to establish the TCP connection between the client and the server.

2. A method according to claim 1, further comprising the step of using a TCP congestion window associated with the located server end, wherein the TCP congestion window has a post-startup size.

3. A method according to claim 1, further comprising the step of using TCP slow-start information associated with the located server end.

4. A computer program product for establishing a TCP connection between a client and a server, wherein the TCP connection comprises a client connection end and a server connection end, and wherein a connection end for the client is defined by a first Internet protocol (IP) address and a first port number, and wherein a connection end for the server is defined by a second IP address and a second port number, said computer program product comprising a computer usable medium having computer readable program code means embodied in said medium, the computer readable program code means comprising:

computer readable code means for receiving a request from the client to the server to establish the TCP connection;

computer readable code means for delaying creation of a socket control block, an Internet control block (INPCB), and a TCP control block (TCPCB) for the requested connection;

computer readable code means for locating a TCP connection having a server end in TIME-WAIT state, wherein the server end is defined by the second IP address and the second port number;

computer readable code means for changing the located server end from TIME-WAIT state to established state; and computer readable code means for using TCP connection information within an TCPCB associated with the located server end to establish the TCP connection between the client and the server.

5. A computer program product according to claim 4, further comprising computer readable program code means for using a TCP congestion window associated with the located server end, wherein the TCP congestion window has a post-startup size.

6. A computer program product according to claim 4, further comprising computer readable code means for using TCP slow-start information associated with the located server end.

7. A data processing system for establishing a TCP connection between a client and a server, wherein the TCP connection comprises a client connection end and a server connection end, and wherein a connection end for the client is defined by a first Internet protocol (IP) address and a first port number, and wherein a connection end for the server is defined by a second IP address and a second port number, said data processing system comprising:

means for receiving a request from the client to the server to establish the TCP connection;

means for delaying creation of a socket control block, an Internet control block (INPCB), and a TCP control block (TCPCB) for the requested connection;

means for locating a TCP connection having a server end in TIME-WAIT state, wherein the server end is defined by the second IP address and the second port number;

means for chancing the located server end from TIME-WAIT state to established state; and means for using TCP connection information within a TCPCB associated with the located server end to establish the TCP connection between the client and the server.

8. A data processing system according to claim 7, further comprising means for using a TCP congestion window associated with the located server end, wherein the TCP congestion window has a post-startup size.

9. A data processing system according to claim 7, further comprising means for using TCP slow-start information associated with the located server end.

* * * * *